United States Patent
Powell et al.

(10) Patent No.: US 10,831,279 B2
(45) Date of Patent: Nov. 10, 2020

(54) APPARATUS AND METHOD FOR CONTROLLING OPERATION OF A COMPONENT

(71) Applicant: Jaguar Land Rover Limited, Coventry (GB)

(72) Inventors: Richard Powell, Coventry (GB); Urmila Mistry, Coventry (GB); Laura Millen, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 15/540,143

(22) PCT Filed: Jan. 6, 2016

(86) PCT No.: PCT/EP2016/050124
§ 371 (c)(1),
(2) Date: Jun. 27, 2017

(87) PCT Pub. No.: WO2016/113158
PCT Pub. Date: Jul. 21, 2016

(65) Prior Publication Data
US 2017/0371419 A1    Dec. 28, 2017

(30) Foreign Application Priority Data
Jan. 14, 2015  (GB) .................................. 1500552.3

(51) Int. Cl.
*G06F 3/01*    (2006.01)
*G06K 9/00*    (2006.01)
(Continued)

(52) U.S. Cl.
CPC ......... *G06F 3/017* (2013.01); *B60H 1/00742* (2013.01); *B60H 1/00821* (2013.01);
(Continued)

(58) Field of Classification Search
None
See application file for complete search history.

(56) References Cited

U.S. PATENT DOCUMENTS

2004/0141634 A1* 7/2004 Yamamoto ............. B60K 37/06
382/104
2006/0044800 A1* 3/2006 Reime ................ H05B 33/0803
362/276
(Continued)

FOREIGN PATENT DOCUMENTS

CN  1253776 C      4/2006
CN  102754052 A   10/2012
(Continued)

OTHER PUBLICATIONS

Combined Search and Examination Report, GB Application No. 1500552.3, dated May 22, 2015, 8 pages.
(Continued)

*Primary Examiner* — Ifedayo B Iluyomade
(74) *Attorney, Agent, or Firm* — Carlson, Gaskey & Olds (57) ABSTRACT

Embodiments of the present invention provide a method for use in a vehicle, comprising determining a distance of a predetermined gesture from a reference location within a vehicle, and initiating an operation responsive to the gesture, wherein a mode of the operation is determined based upon the distance of the gesture from the reference location.

19 Claims, 3 Drawing Sheets

(51) Int. Cl.
  *E05F 15/73* (2015.01)
  *B60H 1/00* (2006.01)
  *B60J 1/20* (2006.01)
  *B60N 2/02* (2006.01)

(52) U.S. Cl.
  CPC .......... *B60J 1/2011* (2013.01); *B60N 2/0244* (2013.01); *E05F 15/73* (2015.01); *G06K 9/00355* (2013.01); *B60N 2002/0268* (2013.01); *E05F 2015/767* (2015.01); *E05Y 2900/542* (2013.01); *E05Y 2900/55* (2013.01)

(56) References Cited

U.S. PATENT DOCUMENTS

| | | | | |
|---|---|---|---|---|
| 2014/0368423 | A1* | 12/2014 | Brenckle ................ | G06F 3/017 345/156 |
| 2015/0234467 | A1* | 8/2015 | Tachibana ............... | G06F 3/017 715/863 |
| 2017/0147080 | A1* | 5/2017 | Watanabe .............. | B60K 35/00 |

FOREIGN PATENT DOCUMENTS

| | | |
|---|---|---|
| CN | 103067607 A | 4/2013 |
| CN | 103914343 A | 7/2014 |
| DE | 102005017250 A1 | 6/2006 |
| DE | 102012216181 A1 | 6/2014 |
| EP | 2908215 A1 | 8/2015 |
| KR | 20130068538 A | 6/2013 |

OTHER PUBLICATIONS

Response to Combined Search and Examination Report, GB Application No. 1500552.3, dated Jan. 5, 2017, 4 pages.

Examination Report, GB Application No. 1500552.3, dated Mar. 9, 2017, 5 pages.

Notification of Transmittal of the International Search Report and the Written Opinion of the International Searching Authority, or the Declaration, PCT/EP2016/050124, dated Mar. 23, 2016.

Chinese Patent Office Action dated Mar. 17, 2020 for Application No. 201680005640.9.

* cited by examiner

APPARATUS AND METHOD FOR CONTROLLING OPERATION OF A COMPONENT

RELATED APPLICATIONS

This application is a 35 U.S.C. § 371 national stage application of PCT Application No. PCT/EP2016/050124, filed Jan. 6, 2016, which claims priority from Great Britain Patent Application No. 1500552.3 filed on Jan. 14, 2015, the contents of which are incorporated herein by reference in their entireties. The above-referenced PCT International Application was published in the English language as International Publication No, WO 2016/113158 A1 on Jul. 21, 2016.

TECHNICAL FIELD

The present disclosure relates to a method for use in a vehicle and an apparatus for use with a vehicle for controlling an operation. In particular, although not exclusively, embodiments of the invention relate to a method and apparatus for controlling movement of a component of the vehicle.

BACKGROUND

It is known to provide numerous components of a vehicle which are operable responsive to a user command. Such components include, without limitation, a roof of a vehicle, a portion of a roof of the vehicle, a sunroof, windows of the vehicle, air vents, a boot or tailgate of the vehicle etc. Often such components are moved by an actuator which may be electrically operated, such as a motor, or hydraulically operated. The actuator is operable responsive to user operation of a corresponding switch. The switch may have a range of movement encompassing two stages. A first stage corresponding to limited or part actuation of the switch causes the actuator to move only for as long as the switch is actuated. In this so-called manual mode of operation the user is able to move the component a limited distance, for example to partly open a roof, sunroof or window of the vehicle. A second stage, which may correspond to full operation of the switch, causes the actuator to move the component to a maximum extent of the components movement, such as fully open or closed. In this way the user can selectively operate the switch to cause a desired amount of movement of the component.

It is an object of embodiments of the invention to at least mitigate one or more of the problems of the prior art.

SUMMARY OF THE INVENTION

According to an aspect of the present invention, there is provided a method for use in a vehicle, comprising determining a distance of a gesture and initiating an operation having a mode responsive to the distance.

According to another aspect of the invention, there is provided a method for use in a vehicle, comprising determining a distance of a predetermined gesture from a reference location within a vehicle and initiating an operation responsive to the gesture, wherein a mode of the operation is determined based upon the distance of the gesture from the reference location.

The operation may be initiated in a first mode responsive to the distance of the gesture being less than a predetermined distance and in a second mode responsive to the gesture being greater than the predetermined distance.

In the first mode, the operation may be proportional to a characteristic of the gesture. The characteristic may be a length of the gesture.

The first mode may be a user-controlled mode of operation. The operation may be caused to stop responsive to a stopping of the gesture.

The operation may be responsive to a direction of the gesture. The operation may be initiated or performed responsive to a direction of the gesture.

The second mode may be where an operation is performed to a maximum extent corresponding to the direction of the gesture. As such this may be where the second mode is an automatic mode of operation. The operation may continue regardless of a stopping of the gesture.

The method may relate to an operation wherein the operation is movement of a component of the vehicle. This may be one of a sunroof, a foldable roof, a window, a seat or an air vent of the vehicle.

The method may relate to a reference location wherein the reference location is a reference plane within the vehicle. Optionally, the reference location may correspond to a surface within the vehicle. The reference location may be proximal to the component of the vehicle.

The method may comprise determining whether the gesture is performed at a distance less than or equal to an operational threshold distance from the reference location, and discarding the gesture if the performed at a distance greater than the operational threshold distance.

According to yet another aspect of the invention there is provided an apparatus for controlling an operation comprising a sensing means for determining a distance of a predetermined gesture from a reference location within a vehicle and a control means for initiating an operation responsive to the gesture, wherein a mode of the operation may be determined based upon the distance of the gesture from the reference location.

The control means may be arranged to initiate the operation in a first mode responsive to the distance of the gesture being less than a predetermined distance and in a second mode responsive to the gesture being greater than the predetermined distance.

In the first mode, the operation may be performed proportional to a characteristic of the gesture. The characteristic may be a length of the gesture. The first mode may be a user-controlled mode of operation. In the first mode, the control means may be arranged to stop the operation responsive to a stopping of the gesture. The control means may be arranged to initiate the operation responsive to a direction of the gesture.

The apparatus may comprise a second mode, wherein the control means is arranged to initiate the operation to be performed to a maximum extent corresponding to the direction of the gesture. The second mode may be an automatic mode of operation. The control means may be arranged to continue the operation regardless of a stopping of the gesture.

The operation may be movement of a component of the vehicle. The component may be one of a sunroof, a foldable roof, a window, a seat or an air vent of the vehicle.

The apparatus may comprise a reference location which is a reference plane within the vehicle. The reference location may correspond to a surface within the vehicle. The reference location may be proximal to the component of the vehicle.

The apparatus may comprise a sensing means comprising a plurality of sensing devices each arranged to output a signal indicative of a proximity of a limb of a person. The control means may be arranged to receive the signal from each of the sensing devices and to determine the distance of the gesture based thereon.

The sensing means may comprise one or more imaging devices. The control means may be arranged to receive image data from the one or more imaging devices and to determine the distance of the gesture based thereon.

There may be provided a vehicle comprising an apparatus detailed previously. The apparatus or vehicle substantially may be described hereinbefore with reference to the accompanying drawings.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only, with reference to the accompanying figures, in which.

DETAILED DESCRIPTION

Embodiments of the present invention provide a method and apparatus in which a distance of a predetermined gesture from a reference location within a vehicle is determined and an operation initiated operation responsive to the gesture, wherein a mode of the operation is based upon the distance of the gesture from the reference location. Advantageously this allows a user to select a mode of the operation easily and conveniently.

Figure 1:
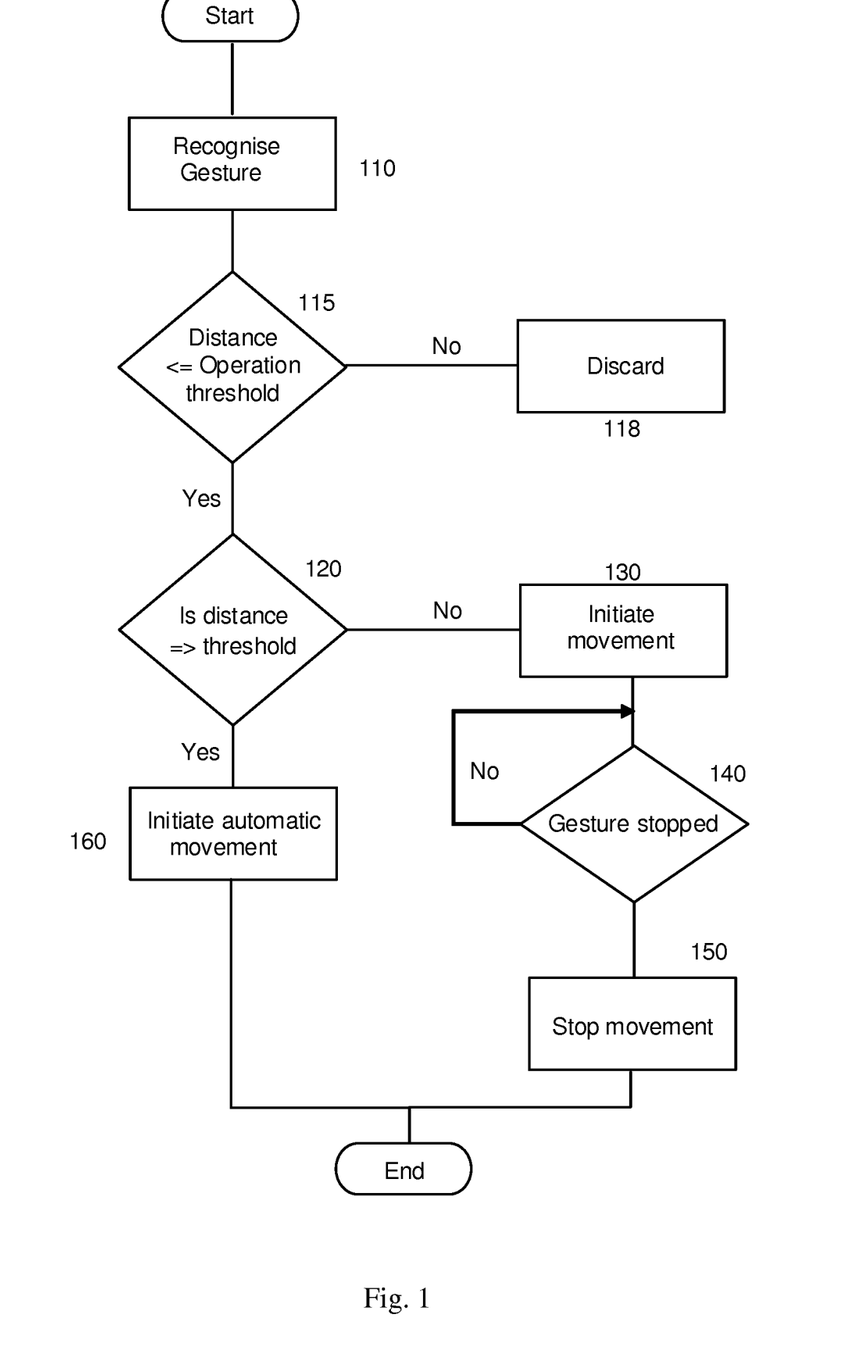
FIG. 1 shows a method according to an embodiment of the invention.

FIG. 1 illustrates a method 100 according to an embodiment of the invention. The method 100 is a method of controlling an operation of a vehicle. The operation is a movement operation of a component of the vehicle, such as of a sunroof, a foldable roof, a window, an air vent of the vehicle or any other moveable component of the vehicle. In particular the method 100 is a method of moving the component responsive to user control i.e. the component is a user-operated component of the vehicle, although it will be realised that the component may also be moved responsive to a function of the vehicle, such as a function which causes the vehicle to become enclosed e.g. for security purposes.

Figure 2:
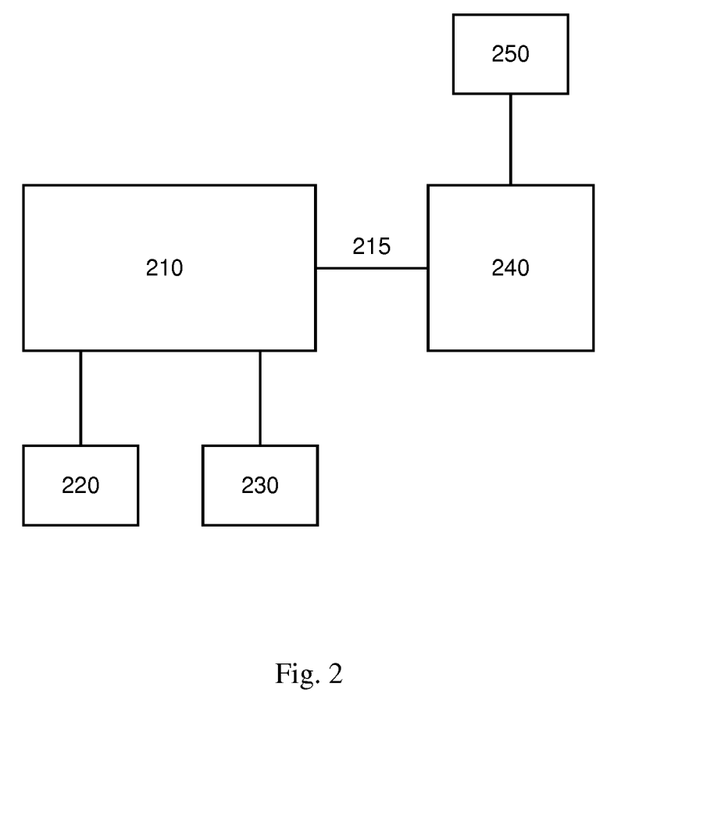
FIG. 2 shows a system according to an embodiment of the invention.

The method may be performed by an apparatus 200 as illustrated in FIG. 2. The apparatus comprises a control means 210 in the form of a control unit 210 which comprises one or more processors for executing computer software which may be arranged to perform a method according to an embodiment of the invention. The software may be stored in a memory (not illustrated) of the control unit 210. The control unit 210 is communicably coupled to a sensing means for sensing a predetermined gesture.

The sensing means may comprise one or more sensing devices 220, 230. In the embodiment illustrated in FIG. 2 the sensing means comprises first and second sensing devices 220, 230. Each sensing device is arranged to sense a presence of a user's limb, such as the user's hand. Each sensing device 220, 230 may be a capacitive sensing device arranged to sense the presence of the user's hand resulting in a change in capacitance of the sensing device. The sensing devices 220, 230 may be arranged to output a field of radiation, such as an electromagnetic field, acoustic or illumination and to detect the presence of the user's hand by detecting a perturbation in the field or receiving reflected radiation, such as reflected sound waves or illumination.

Based on respective outputs of a plurality of sensing devices, such as the first and second sensing devices 220, 230, a location of the user's hand may be determined with respect to the sensing devices 220, 230. Based on the outputs of the sensing devices the control unit 210 is arranged to detect when the user performs a swipe gesture with their hand proximal to i.e. within a sensing range of the sensing devices 220, 230. The swipe gesture is a movement of the limb of the user, such as the hand, in a predetermined direction. The predetermined direction is parallel with an axis intersecting the plurality of sensing devices 220, 230, as will be explained.

It will be realised that in other embodiments the gesture may be recognised using image recognition. The control unit 210 may be arranged to receive image data from one or more cameras within the vehicle arranged to provide image data corresponding to at least an area within the vehicle where the gesture is performed. Based on the image data the control unit 210 is arranged to recognise one or more gestures.

The control unit 210 is arranged to output a control signal 215 to initiate an operation. The control signal 215 is received by a corresponding operation unit 240 of the vehicle, such as a unit for controlling movement of the sunroof or vehicle windows. The operation unit 240 is arranged to control one or more actuators 250 to move the component of the vehicle, such as the sunroof or vehicle windows. For example the actuator 250 may be a motor arranged to move the sunroof or vehicle window responsive to signals from the operation unit 240.

Figure 3:
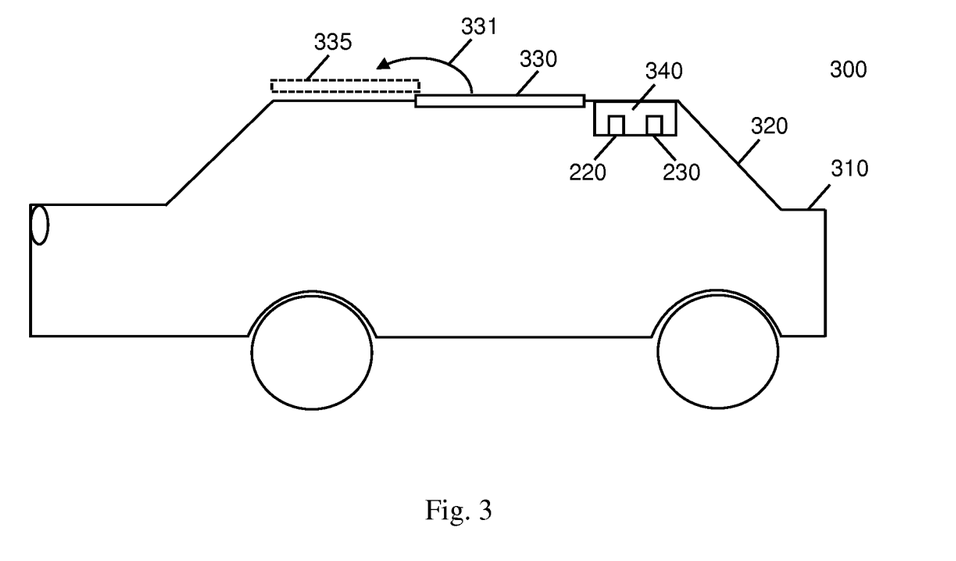
FIG. 3 shows a partial cross section through a vehicle according to an embodiment of the invention.

Referring to FIG. 3, there is illustrated an embodiment of the invention arranged in use in a vehicle. In the embodiment illustrated in FIG. 3, the component of the vehicle is a sunroof of the vehicle i.e. an at least partly transparent portion of the vehicle's roof which is openable and closeable responsive to a command from the user. However it will be realised that other components of the vehicle, particularly although not exclusively windows of the vehicle, may controlled by embodiments of the invention.

FIG. 3 illustrates a longitudinal cut-through 300 of a vehicle 310. The vehicle 310 is a land-going vehicle although it will be realised that embodiments of the invention may be used with water-borne or airborne vehicles such as boats or aircraft. The vehicle 310 comprises a windscreen 320 and a sunroof 330 which is openable and closeable responsive to a predetermined user gesture. The sunroof 330 is moveable 331 between a closed position, as illustrated in sold lines in FIG. 3, and an open position 335 as illustrated in dashed lines. Embodiments of the invention also allow the sunroof to be positioned by the user at an intermediate position between the closed and open positions 330, 335 although this is not shown in FIG. 3.

In the vehicle 310 there is located a control console 340 via which an occupant of the vehicle for example, although not exclusively, the driver may control or operate the sunroof 330. The console 340 is located in an upper region of an interior compartment of the vehicle 310, such as in a portion of a roof above the windscreen 320, although it will be realised that this is merely exemplary and that the console 340 may be located elsewhere within the vehicle. The console 340 comprises the first and second sensing devices 220, 230 described above. The first sensing device 220 may be arranged toward a rear of the vehicle 310 whilst the second sensing device 230 is installed toward a front of the vehicle aligned along the longitudinal axis of the vehicle, although it will be realised that other arrangements may be envisaged and, furthermore, since the controls are operable in both forward and reverse direction to, respectively, open and close the sunroof 330, the designations first and second do not imply any difference between the sensing devices 220, 230. The sensing devices 220, 230 are arranged to detect a swipe gesture parallel to the longitudinal axis.

An output indicative of the proximity of the user's limb to a respective sensing device 220, 230 is provided from each sensing device 220, 230. The outputs are provided to the control unit 210. Based on the plurality of outputs the control unit 210 is arranged to recognise the swipe gesture, to determine a direction of the swipe gesture, such as forward or backward relative to the vehicle i.e. toward or away from the windscreen 320, and whether the swipe gesture is continuing i.e. is currently on-going or being performed. The control unit 210 is also arranged to determine a distance of the gesture from a reference location within the vehicle 310. The reference location may be from a reference plane, such as coincident with a front or lower surface of the console, although it will be realised that other reference locations may be determined. The control unit 210 may be arranged to determine the distance of the gesture based upon a strength or magnitude of the signal output by each sensing device 220, 230.

Returning to FIG. 1, the method 100 comprises a step of recognising a predetermined gesture. The predetermined gesture may be the swipe gesture discussed above, although it will be realised that other gestures may be recognised. In the case of the swipe gesture the gesture may be recognised by the control unit 210 receiving signals from a plurality of sensing devices 220, 230 indicative of the presence of the user's limb or hand moving in a direction substantially parallel to an axis intersecting the plurality of sensing devices 220, 230. That is, the movement is in a direction generally toward at least one sensing device and away from at least one other sensing device. The gesture may be performed between a start location and a destination location within the vehicle. The gesture may be performed in a direction corresponding to a desired direction of movement of a component of the vehicle 310, such as the sunroof 330. Thus the start and destination locations of the gesture may depend upon the desired direction of movement. Step 110 may comprise determining a distance the gesture from a reference location within the vehicle, such as a reference plane. The reference plane may be coincident with a surface within the vehicle, such as a surface of the vehicle interior.

In step 115 it is determined whether the distance of the gesture from the reference location is less than a predetermined operational threshold distance. The operational threshold distance is a maximum distance at which the method 100 is responsive to the gesture. If the gesture is performed at a distance greater than the operational threshold distance then the gesture is discarded, or ignored, in step 118. That is, the method is not responsive to gestures performed at a distance greater than the operational threshold distance to prevent false activation such as due to inadvertently or accidentally performed gestures. If the gesture is performed at a distance equal to or less than the operational threshold distance then the method moves to step 120. In other words the method is responsive to the gesture performed at a distance of equal to or less than the operation threshold distance.

In step 120 it is determined whether the distance of the gesture from the reference location is greater than a predetermined mode threshold distance. For example, the mode threshold distance may be 100 mm from the reference plane, although it will be realised that this distance is an example and that other distances may be selected. In step 120 a mode of operation is determined based upon the distance of the gesture from the reference location. Thus, in step 120 it is determined whether the gesture is performed closer than the mode threshold distance to the reference location, or greater than the mode threshold distance from the reference location. In embodiments where the gesture is a swipe, step 120 comprises determining whether the swipe is performed along a path which is greater than the predetermined mode threshold distance from the reference location. It will be noted that the mode threshold distance is less than the operational threshold distance.

If the gesture is performed less than the mode threshold distance from the reference location i.e. closer to the reference location, then the method moves to step 130. In step 130 and the following steps the mode of operation is a mode wherein continuation of the operation is dependent upon continuation of the gesture. That is, if the gesture is stopped the associated operation is stopped. Therefore the operation is manually controlled by the user. If the gesture is performed more than the mode threshold distance, or more than or equal to the mode threshold distance, the method moves to step 160. In step 160 an operation is performed wherein the operation is completed in step 160 regardless of whether the gesture is completed, the limb leaves the sensing range of the sensing devices 220, 230 mid-gesture, or exceeds the operational threshold distance mid-gesture.

Whilst in the described embodiment the mode wherein continuation of the operation is dependent upon continuation of the gesture is performed when the gesture is closer to the reference location than the mode threshold distance, it will also be realised that said mode may be performed when the gesture is greater than the mode threshold distance i.e. the modes may be reversed with respect to the mode threshold distance. In the case where the operation is manually controlled, when the gesture is performed at a distance greater than the mode threshold distance, the operation may be stopped when the user's limb leaves the sensing range of the sensing devices 220, 230 or exceeds the operational threshold distance.

In step 130 the operation comprising movement of one or more components of the vehicle is initiated. For example the operation may comprise movement 331 of the sunroof 330 of the vehicle, but may comprise in other embodiments movement of one or more windows of the vehicle 310, movement of a seat (or component thereof such as a backrest) of the vehicle, movement of an air vent, etc. For example the movement 331 of the sunroof 330 may be initiated in a direction to open the sunroof, such as in a direction generally toward a rear of the vehicle, corresponding to a direction of the swipe gesture.

In step 140 it is determined whether the gesture has stopped, or is continuing. If the gesture is continuing i.e. has not stopped, then the method loops back to step 140 such that the movement of the component continues in dependence on the gesture. That is the movement is continued for as long as the gesture. For example movement 331 of the sunroof continues whilst the gesture is in progress. If, however, the gesture has stopped, then the method moves to step 150. Therefore it can be appreciated that the operation is proportional to a characteristic of the gesture. The characteristic may be a length of the gesture, such as where the gesture is a swipe gesture.

In step 150 the operation is stopped. In particular, in embodiments of the invention the movement of the component of the vehicle 310 is stopped responsive to the stopping of the gesture. For example, if the swipe gesture is stopped by the user of the vehicle, then the corresponding movement of the component, such as the sunroof, is also stopped. This allows the user to manually control or to select the stopping position.

In step 160 an operation is commenced in a mode where the operation is completed. The operation is completed irrespective of whether the gesture initiating the operation is continued or completed. That is, in step 160 the operation is performed to completion regardless of whether the initiating gesture is also completed.

In one embodiment where the gesture is the swipe gesture initiating movement 331 of the sunroof 330, the sunroof is moved to a completed position corresponding to the direction of the swipe gesture. For example, the sunroof 330 may be moved to a completely open position or a completely closed position even if the corresponding gesture is not completed. In this way the user is able to perform the gesture to initiate the operation but does not have to continue the gesture to completion thereby allowing a quick instruction to perform an operation, such as moving the component of the vehicle.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

Further aspects of the invention are set out in the following numbered paragraphs:

1. A method for use in a vehicle, comprising determining a distance of a predetermined gesture from a reference location within a vehicle; and initiating an operation responsive to the gesture, wherein a mode of the operation is determined based upon the distance of the gesture from the reference location.
2. The method of paragraph 1, wherein the operation is initiated in a first mode responsive to the distance of the gesture being less than a predetermined distance and in a second mode responsive to the gesture being greater than the predetermined distance.
3. The method of paragraph 2, wherein, in the first mode, the operation is proportional to a characteristic of the gesture.
4. The method of paragraph 3, wherein the characteristic is a length of the gesture.
5. The method of paragraph 2, wherein the first mode is a user-controlled mode of operation.
6. The method of paragraph 2, wherein, in the first mode, the operation is caused to stop responsive to a stopping of the gesture.
7. The method of paragraph 1, wherein the operation is responsive to a direction of the gesture.
8. The method of paragraph 7, wherein in the second mode, the operation is performed to a maximum extent corresponding to the direction of the gesture.
9. The method of paragraph 2, wherein the second mode is an automatic mode of operation.
10. The method of paragraph 2, wherein, in the second mode, the operation continues regardless of a stopping of the gesture.
11. The method of paragraph 1, wherein the operation is movement of a component of the vehicle.
12. The method of paragraph 1, wherein the component is one of a sunroof, a foldable roof, a window, a seat, a sunblind, privacy blinds or an air vent of the vehicle.
13. The method of paragraph 1, wherein the reference location is a reference plane within the vehicle.
14. The method of paragraph 13, wherein the reference location corresponds to a surface within the vehicle.
15. The method of paragraph 13 when dependent on paragraph 11, wherein the reference location is proximal to the component of the vehicle.
16. The method of paragraph 1, comprising determining whether the gesture is performed at a distance less than or equal to an operational threshold distance from the reference location, and discarding the gesture if performed at a distance greater than the operational threshold distance.
17. An apparatus for controlling an operation, comprising sensing device for determining a distance of a predetermined gesture from a reference location within a vehicle; and a control device for initiating an operation responsive to the gesture, wherein a mode of the operation is determined based upon the distance of the gesture from the reference location.

18. The apparatus of paragraph 17, wherein the control device is arranged to initiate the operation in a first mode responsive to the distance of the gesture being less than a predetermined distance and in a second mode responsive to the gesture being greater than the predetermined distance.

19. The apparatus of paragraph 18, wherein, in the first mode, the operation is performed proportional to a characteristic of the gesture.

20. The apparatus of paragraph 19, wherein the characteristic is a length of the gesture.

21. The apparatus of paragraph 17, wherein the first mode is a user-controlled mode of operation.

22. The apparatus of paragraph 17, wherein, in the first mode, the control device is arranged to stop the operation responsive to a stopping of the gesture.

23. The apparatus of paragraphs 17, wherein the control device is arranged to initiate the operation responsive to a direction of the gesture.

24. The apparatus of paragraph 23, wherein in the second mode, the control device is arranged to initiate the operation to be performed to a maximum extent corresponding to the direction of the gesture.

25. The apparatus of paragraphs 18, wherein the second mode is an automatic mode of operation.

26. The apparatus of paragraph 18, wherein, in the second mode, the control device is arranged to continue the operation regardless of a stopping of the gesture.

27. The apparatus of paragraph 17, wherein the operation is movement of a component of the vehicle.

28. The apparatus of paragraph 27, wherein the component is one of a sunroof, a foldable roof, a window, a seat, a sunblind, privacy blinds or an air vent of the vehicle.

29. The apparatus of paragraph 17, wherein the reference location is a reference plane within the vehicle.

30. The apparatus of paragraph 29, wherein the reference location corresponds to a surface within the vehicle.

31. The apparatus of paragraph 29 when dependent on paragraph 27, wherein the reference location is proximal to the component of the vehicle.

32. The apparatus of paragraph 17, wherein the sensing device comprises a plurality of sensing devices each arranged to output a signal indicative of a proximity of a limb of a person.

33. The apparatus of paragraph 32, wherein the control device is arranged to receive the signal from each of the sensing devices and to determine the distance of the gesture based thereon.

34. The apparatus of paragraph 17, wherein the sensing device comprises one or more imaging devices.

35. The apparatus of paragraph 34 wherein the control device is arranged to receive image data from the one or more imaging devices and to determine the distance of the gesture based thereon.

36. A vehicle comprising an apparatus according to paragraph 17.

The invention claimed is:
1. A method of controlling an operation of a component of a vehicle, the method comprising:
recognizing a gesture as at least one predetermined gesture;
determining a direction of the recognized gesture;
determining whether the recognized gesture was performed a first distance from a reference location within the vehicle or a second, different distance from the reference location;
selecting a first mode of operation for moving the component of the vehicle when the recognized gesture was performed the first distance from the reference location; and
selecting a second, different mode of operation for moving the component of the vehicle when the recognized gesture was performed the second distance from the reference location,
wherein
the first mode is a user-controlled manual mode of operation wherein continuation of moving the component of the vehicle is dependent upon continuation of the recognized gesture,
the second mode is an automatic mode of operation wherein moving the component continues regardless of a stopping of the recognized gesture, and
in both the first mode and the second mode, moving the component of the vehicle comprises moving the component of the vehicle in the direction of the recognized gesture.

2. The method of claim 1, wherein, in the first mode, the operation is caused to stop in dependence on a stopping of the gesture.

3. The method of claim 1, wherein, in the second mode, the operation is performed to a maximum extent corresponding to the direction of the gesture.

4. The method of claim 1, wherein the reference location is a reference plane corresponding to a surface within the vehicle.

5. The method of claim 1, comprising determining whether the gesture is performed at a distance less than or equal to an operational threshold distance from the reference location, and ignoring the gesture if performed at a distance greater than the operational threshold distance.

6. An apparatus comprising:
a sensing device configured to recognize a gesture as at least one predetermined gesture and a direction of the gesture; and
a control unit configured to:
determine whether the recognized gesture was performed a first distance from a reference location within the vehicle or a second, different distance from the reference location;
selecting a first mode of operation for moving the component of the vehicle when the recognized gesture was performed the first distance from the reference location; and
selecting a second, different mode of operation for moving the component of the vehicle when the recognized gesture was performed the second distance from the reference location,
wherein
the first mode is a user-controlled manual mode of operation wherein continuation of moving the component of the vehicle is dependent upon continuation of the recognized gesture,
the second mode is an automatic mode of operation wherein the operation continues regardless of a stopping of the recognized gesture, and
in both the first mode and the second mode, moving the component of the vehicle comprises moving the component of the vehicle in the recognized direction of the gesture.

7. The apparatus of claim 6, wherein, in the first mode, the operation is performed proportional to a characteristic of the gesture.

8. The apparatus of claim 6, wherein, in the first mode, the control unit is configured to stop the operation in dependence on a stopping of the gesture.

9. The apparatus of claim 6, wherein, in the second mode, the control unit is configured to initiate the operation to be performed to a maximum extent corresponding to the direction of the gesture.

10. The apparatus of claim 6, wherein the component is one of a sunroof, a foldable roof, a window, a seat, a sunblind, privacy blinds or an air vent of the vehicle.

11. The apparatus of claim 6, wherein the reference location is a reference plane within the vehicle.

12. The apparatus of claim 6, wherein the reference location is constant relative to the component of the vehicle.

13. The apparatus of claim 6, wherein the sensing device comprises a plurality of sensing devices each configured to output a signal indicative of a proximity of a limb of a person, and the control unit is configured to receive the signal from each of the sensing devices and to determine the distance of the gesture based on the received signals.

14. The apparatus of claim 6, wherein the sensing device comprises one or more imaging devices, and the control unit is configured to receive image data from the one or more imaging devices and to determine the distance of the gesture based on the received image data.

15. A vehicle comprising the apparatus of claim 6.

16. The apparatus of claim 6, wherein
the first distance is one of a plurality of distances within a first range from the reference location, and
the second distance is one of a plurality of distances within a second, different range from the reference location.

17. The apparatus of claim 6, wherein the reference location is a location of the sensing device.

18. The method of claim 1, wherein
the first distance is one of a plurality of distances within a first range from the reference location, and
the second distance is one of a plurality of distances within a second, different range from the reference location.

19. The method of claim 1, wherein the reference location is a location of the sensing device.

* * * * *